United States Patent [19]

Spease

[11] Patent Number: 5,673,953

[45] Date of Patent: Oct. 7, 1997

[54] BREAKAWAY ICC BUMPER

[76] Inventor: Donald R. Spease, 11539 E. Lexington, Apt. A, Independence, Mo. 64054

[21] Appl. No.: 713,797

[22] Filed: Sep. 13, 1996

[51] Int. Cl.$^6$ .................................................. B60R 19/02
[52] U.S. Cl. ........................................ 293/118; 293/119
[58] Field of Search ................................ 293/131, 118, 293/119, 137

[56] References Cited

U.S. PATENT DOCUMENTS

| | | | |
|---|---|---|---|
| 3,913,963 | 10/1975 | Persicke | 293/15 |
| 4,514,002 | 4/1985 | McIntosh | 293/15 |
| 4,541,661 | 9/1985 | Hawk | 293/137 |
| 4,582,351 | 4/1986 | Edwards | 293/15 |
| 4,770,420 | 9/1988 | Gottwald et al. | 293/118 X |
| 5,022,703 | 6/1991 | Westbrook | 293/15 |

FOREIGN PATENT DOCUMENTS

| | | | |
|---|---|---|---|
| 2603283 | 8/1976 | Germany | 293/131 |
| 2095630 | 10/1982 | United Kingdom | 293/131 |

Primary Examiner—Joseph D. Pape
Attorney, Agent, or Firm—Patent & Trademark Services; Joseph H. McGlynn; Thomas Zack

[57] ABSTRACT

A movable bumper used on a load carrying vehicle such as an eighteen wheeler truck-trailer. The three bumpers sections are connected together with the upper section having a one-way hinged connection and biasing springs with pulley/cable connectors. When the bumper's lower section is struck by an obstruction with sufficient impact, that section and a connected vertical support section pivot upwardly and outwardly out of the way on the hinged connection against the biasing action of the upper section's springs and connected pulleys/cables. After the obstruction is removed, the bumpers two lower sections return to their normally vertical disposed positions. Support struts with internal springs may be used as additional bumper support and protection between the bumper and the vehicle's or trailer's undercarriage.

6 Claims, 2 Drawing Sheets

FIG. 1
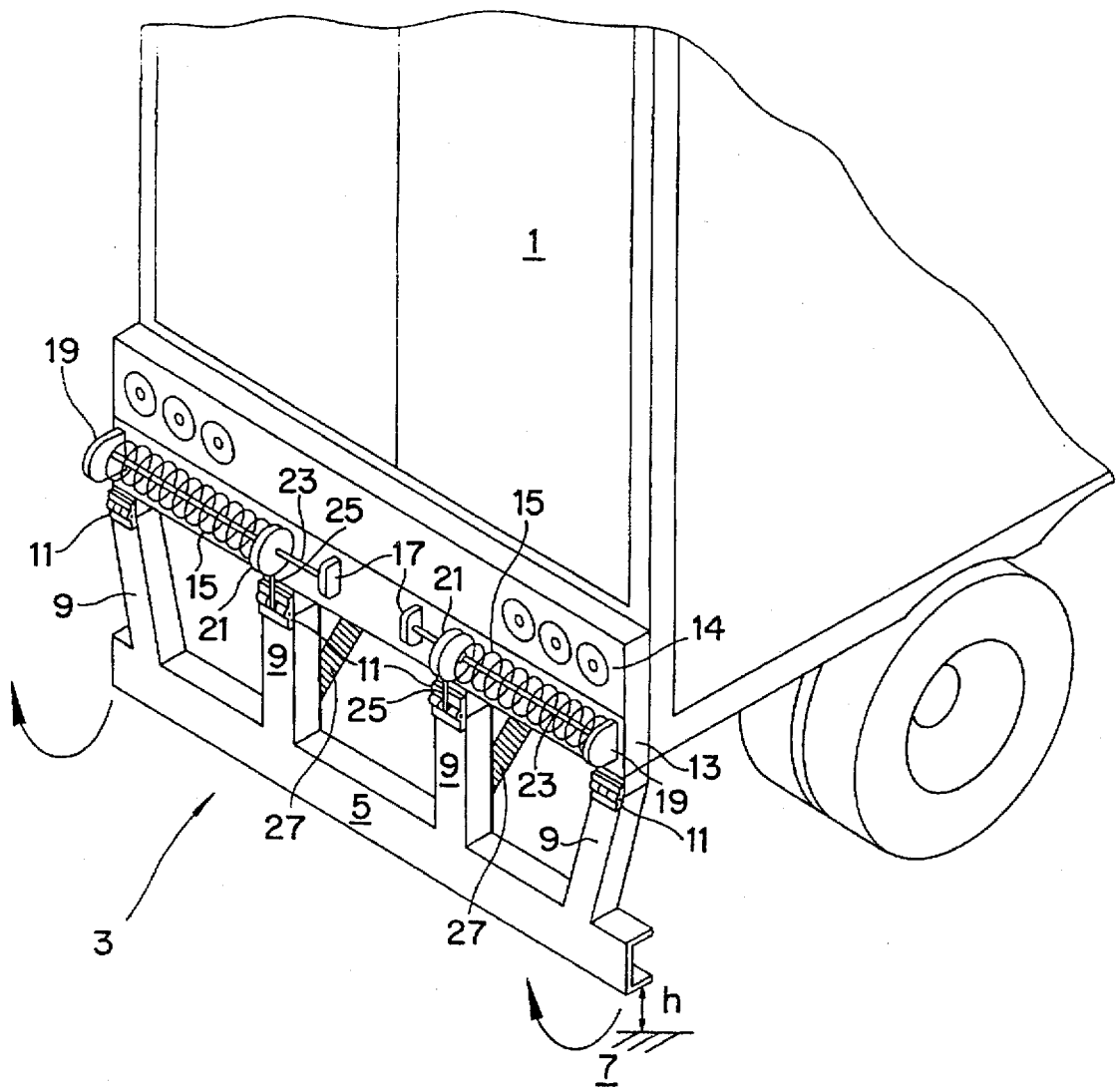
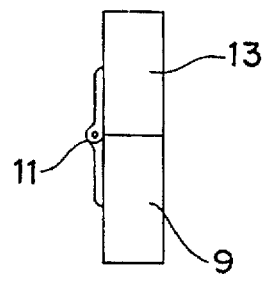
FIG. 2A
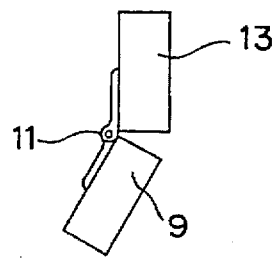
FIG. 2B

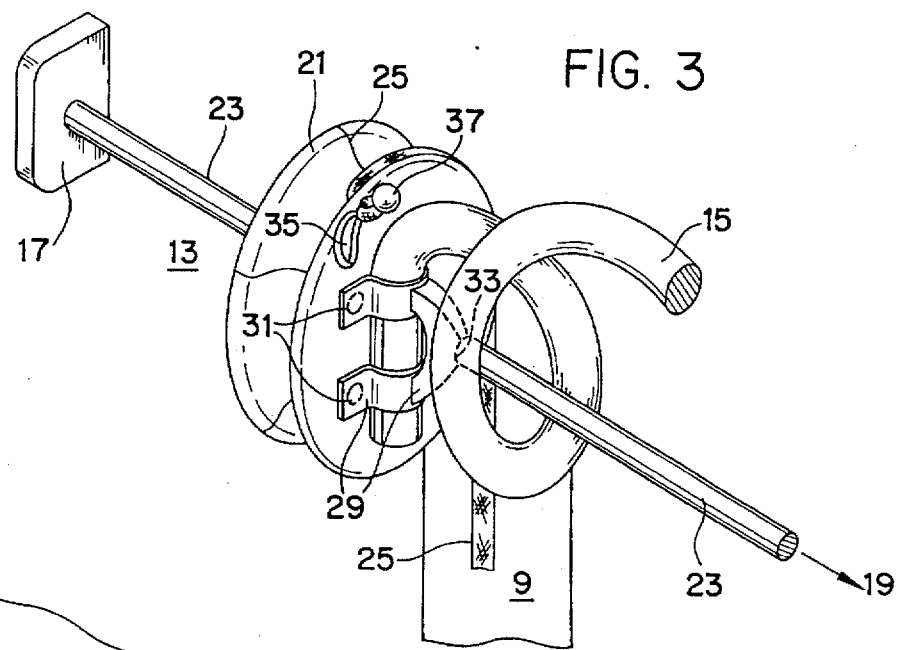
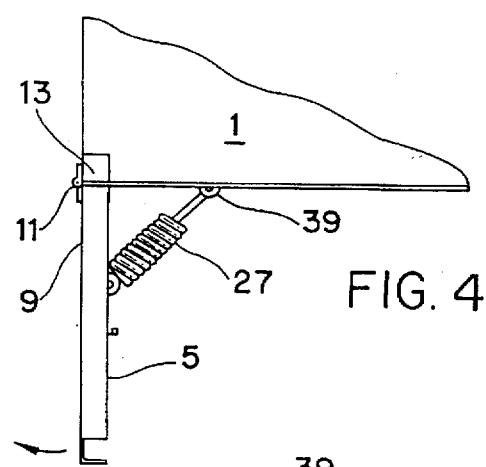
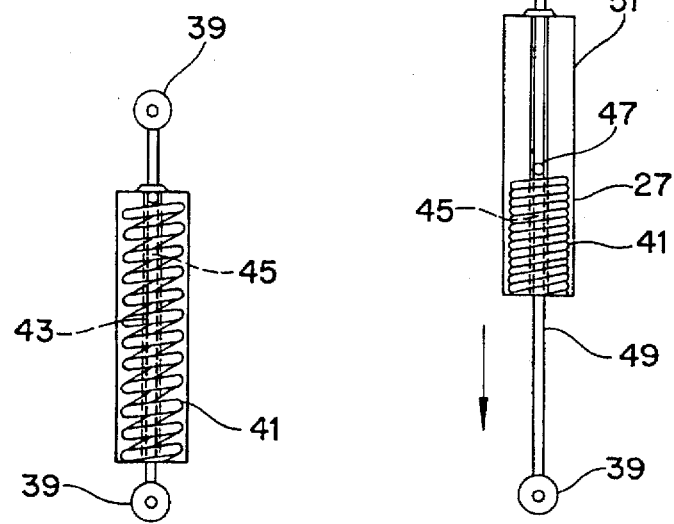
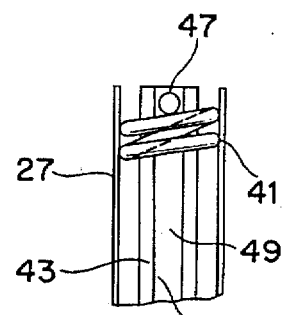
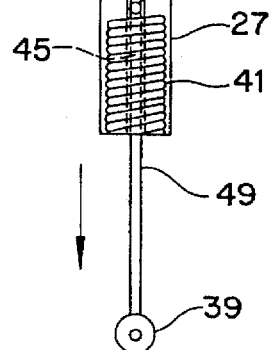

5,673,953

BREAKAWAY ICC BUMPER

BACKGROUND OF THE INVENTION

Large heavy load carrying trucks, especially those subject to the jurisdiction of the U.S. Interstate Commerce Commission (ICC), have front and rear bumpers which protrude from the vehicle at a certain height above ground. Unfortunately, roadside obstructions and other vehicles may contact these bumpers with considerable force. In such situations, damage can occur to both the vehicle(s) or the obstruction, or both. When the obstruction is considered generally unmovable, such as a railroad track or a dip in the roadbed, considerable damage can be inflicted on the moving truck. The present invention seeks to minimize such damage to truck bumpers and impacted objects by providing for an improved bumper design which will allow the bumper to flex outwardly when engaged while providing for additional collision protection.

DESCRIPTION OF THE PRIOR ART

Many of the prior art vehicle bumpers have been modified to take into consideration roadside obstructions. For example, in U.S. Pat. No. 3,913,963 to Persicke, a shock absorber is mounted on the vehicle's lower bumper to absorb impact forces.

In another reference, U.S. Pat. No. 4,514,002 to Mcintosh, a two position bumper for off road vehicles and, when lowered, for conventional street use or towing is described.

The Edward patent (U.S. Pat. No. 4,582,351) discloses a hydraulic mechanism used to lower or raise vehicle bumpers and latch them in place. In U.S. Pat. No. 5,022,703 to Westbrook, a retractable rear bumper which can be lifted and protected before a truck dumps its load is disclosed.

The present invention differs from the known prior art by providing for a spring and pulley mounted vehicle bumper which will move towards its truck's rear if caught on an obstruction as more fully described in this specification.

SUMMARY OF THE INVENTION

This invention relates to a bumper for use with a motor vehicle. The bumper is mounted to the vehicle by upper hinged connections and is biased in one direction by transversally mounted tension springs. Engaging these springs are a cable pulley link which is connected to the bumper. When an obstruction contacts the bumpers bottom portion, it moves at its upper hinged against the biasing action of the springs and attached pulley link. This causes the bumper's lower end to move outwardly away from the vehicle. Tube type struts with inner tension springs may extend from the vehicle's undercarriage to the bumper supports for added collision protection.

It is the primary object of the present invention to provide for an improved breakaway vehicle bumper.

Another object is to provide for such a bumper usable for loading carrying trucks wherein the bumper's lower portion moves away from the vehicle when impacting an obstruction.

These and other objects and advantages of the present invention will become apparent to readers from a consideration of the ensuing description and the accompanying drawings.

BRIEF DESCRIPTION OF THE DRAWINGS

FIG. 1 is a perspective rear view of the invention's preferred embodiment mounted to the rear of a truck.

FIGS. 2(a) and 2(b) are side views of the upper hinge mount for the bumper.

FIG. 3 is an enlarged perspective view showing the connection between the pulley assembly and the transverse spring.

FIG. 4 is a side view of the added supporting strut assembly.

FIGS. 5(a)–(c) show the internal spring strut workings.

DESCRIPTION OF THE PREFERRED EMBODIMENT

FIG. 1 is a perspective rear view of the invention's preferred embodiment mounted to the rear of a conventional enclosed truck. The invention's finds its primary use in large loading carrying truck's 1, such as eighteen wheel trailers. Mounted to the trailing or rear end of the vehicle is the bumper 3. The lower bumper portion 5 is horizontally disposed and spaced above the ground 7 below. For safety reasons the lowest most part of bumper portion 5 is spaced above the ground no more than a fixed distance h (e.g. h=18 inches) such that if the truck's bumper were to impact an automobile's bumper it would not necessarily ride over it into the automobile's passenger compartment. Supporting the depending lower bumper portion are one or more vertical support members 9 four of which are shown. The two outermost supports are sloped slightly inwardly while the two inner support members are vertically disposed. At the upper ends of each support are one-way hinge mounts 11 which vertically support the weight of the four supports and lower bumper portion 5. These hinge mounts, in turn, interconnect the support members 9 to the upper horizontal disposed bumper section 13.

Upper bumper section 13 sits below the vehicle's rear light bank 14 and serves as the mounting base for the two spaced horizontal coil tension springs 15. Each spring has an inner mount support 17 and an outer mount support 19. Adjacent spring's inner mount support is a rotatable pulley assembly 21 which is mounted on a horizontal rod 23 which extends from the inner to outer mount support. Extending from each pulley is a cable 25 which is fixed to one of the two inner supports 9 as shown. To provide additional support for the bumper two spring loaded strut supports 27 may be attached to the vehicle's undercarriage and extend in a downward sloping fashion to where they join with the inner bumper near where its two inner supports attach to the lower bumper portion 5.

FIGS. 2(a) and 2(b) are side views of the upper hinge mounts for the bumper's support members 9. Each of the four one-way hinges 11 interconnects the upper bumper section 13 to a vertically disposed support member 9. The hinge lies flat (see FIG. 2(a) ) against the upper section and support such that it allows the support member 9 to move upward when an obstruction on or attached to the ground strikes the bumper's lower portion 5. The member 9, upon striking an object can pivot upwardly and outwardly away from the vehicle as shown in FIG. 2(b) and by the arrow in FIG. 1.

FIG. 3 is an enlarged perspective view showing the connection between the pulley assembly 21 and the transverse spring 15. The rod 23 is encircled by the spring and is rotatably mounted at its two end mounts 17 and 19 while the rod is fixedly mounted to the pulley assembly 21. Each of the coil springs 15 have their ends mounted to the pulley and the outer mounts 19. Brackets 29 which are welded to the pulley 21 at four points 31 rigidly connect the rotatable rod or shaft 23 at the stamped connector joint 33. A tapered connector 35 through the pulley's surface acts as the holder for the enlarged end 37 for the cable 25. At its other end cable 25 is fixed near the upper end of one of each of the two inner supports 9. Normally, the spring 15 has sufficient biasing force to maintain the bumper's support 9 and lower portion 5 vertically disposed as shown in FIG. 1. When an obstruction is impacted with sufficient force, the lower bumper portion 5 and its attached upper support move outwardly at the hinge 11 against the spring's biasing action. When this happens the cable 25 fixed to one of the inner support members 9 is pulled down against the spring's biasing action. As soon as the obstruction is out of the way, the spring 15 rotates the rod 23 with its attached pulley 21 back to its original FIG. 1 position.

FIG. 4 is a side view of the added supporting strut assembly 27. This assembly extends in a downward sloping direction from the vehicle's undercarriage to where it joins the bumper's support 9 near the upper part of the bumper's lower portion 5. Each of the strut's ends 39 are joined with an eye opening to a horizontal pin such that the strut may pivot around the pin connection.

FIGS. 5(a)–(c) show the internal spring strut workings. As best shown in the cut away views of FIGS. 5(a) and (b), each strut has an internal coil spring 41 which encircles a rod 43 having an elongated slide groove 45 along its length. A catch bar 47, shown in cross section, rides in the slide groove 45 and is attached to an inner movable slide bar section 49 and also bears against one end of the spring. This slide bar section is rigidly attached to at its other end to one of the eye ends 39. Initially, in FIG. 5(a), the internal spring 41 is confined within a housing for strut 27 and has the bar 43 with its slide section 49 in its center. When an obstruction is struck by the bumper's lower portion 5, the slide section 49 is moved along with its attached support 9 to compress the confined spring 41 as shown in FIG. 5(b). FIG. 5(c) is an enlarged upper sectional view showing the catch bar 47 attached to the movable slide section 49 which rides in the groove 45 The catch bar serves as an upper stop for the spring 41 and acts to bear against it to compress the spring. After, the obstruction has been removed from the bumper's lower movable portion 5, the compressed spring of FIG. 5(b) expands to its FIG. 5(a) uncompressed position within the strut's housing.

The major components of the preferred embodiment can be manufactured using conventional cut and weld techniques. Most of the bumper's components including the lower portion 5, the four supports 9 and the upper section 13 can be made of steel which has been cut to proper length using a metal cutting band saw. A table top jig can be used to hold the precut metal pieces in accurate alignment for welding. This arrangement provides a high quality end product which is consistent in construction. Various sizes for the preferred embodiment can be tooled up very quickly using this technique, which utilizes a series of metal pegs and clamps on a perfectly flat steel table.

The springs 15 and rods 23 can be fabricated from stainless steel tubing and rods, respectively, which are available as "off the shelf" items. The slotted strut rod 43 is fabricated by milling the slot 45 in the rod. The entire rod/spring assembly is installed inside a stainless tube outer strut housing 51. End caps for the strut housing may be made of stainless steel and welded onto the housing's two ends. Bolts or other types of fastener pins are used to mount the strut housing and its enclosures to the trailer's undercarriage and the bumper and may be replaced should the need arise.

The bracket connector 29 can be manufactured using metal stamping techniques. Metal stamping is a process which involves a male and female die, both are machined into the shape of the desired finished product. The dies are made of hardened too steel and are placed in the jaws of a hydraulic press. In operation, the steel material to be shaped and punched is placed between the two die components and the hydraulic press activated. The two die quickly stamp and punch out the desired shape from the sheet metal, producing the desired metal component.

The other components, including the pulleys 21, the cables 25, hinges 11, and coiled springs are "off the shelf" components. A good source for locating commercial suppliers for such components is the Thomas Register.

Although the present invention and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A motor vehicle bumper for use on a motor vehicle comprising:

an upper bumper section mounted to said vehicle and having hinged connections and biasing means thereon to normally bias an attached vertical support member towards a generally vertical disposition;

said biasing means including a horizontally disposed spring attached to a pulley having a depending cable attached to said support member;

said vertical support member being connected to said upper section's hinged connections and vertically depending therefrom; and a lower bumper section attached to said support member and movable therewith about said hinged connection against said biasing means when impacted by an obstruction.

2. The invention as claimed in claim 1, wherein there are a plurality of said biasing means and support members, each of said biasing means being located on the upper bumper section and having an extending pulley cable member attached to a different support member.

3. The invention as claimed in claim 2, also including support struts attached to said vehicle's undercarriage and extending to one side of said bumper.

4. The invention as claimed in claim 3, wherein said support struts have internal springs encircling a movable rod, said spring being subject to compression when an obstruction strikes the bumper's lower section to move it outwardly on its hinged connection.

5. The invention as claimed in claim 4, wherein there are at least two pulleys with extending cables each of which is attached to different bumper supports, and two support struts each of which is attached to the same vertical support members as the cables.

6. The invention as claimed in claim 5, also including a load carrying truck as the vehicle, said truck having a depending pulled trailer to which said bumper is attached at its lower rear end.

* * * * *